United States Patent
Bremner et al.

(10) Patent No.: US 12,142,967 B2
(45) Date of Patent: Nov. 12, 2024

(54) ELECTRIC MACHINE WITH INTEGRATED DAM ASSEMBLY

(71) Applicant: Deere & Company, Moline, IL (US)

(72) Inventors: Ronald D. Bremner, Waterloo, IA (US); Rainer Gugel, Mannheim (DE); David Mueller, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 285 days.

(21) Appl. No.: 17/616,404

(22) PCT Filed: Aug. 18, 2020

(86) PCT No.: PCT/US2020/046763
§ 371 (c)(1),
(2) Date: Dec. 3, 2021

(87) PCT Pub. No.: WO2021/034808
PCT Pub. Date: Feb. 25, 2021

(65) Prior Publication Data
US 2022/0247274 A1   Aug. 4, 2022

Related U.S. Application Data

(60) Provisional application No. 62/889,540, filed on Aug. 20, 2019.

(51) Int. Cl.
*H02K 1/276*   (2022.01)
*B60K 1/00*    (2006.01)
(Continued)

(52) U.S. Cl.
CPC ............... *H02K 1/276* (2013.01); *H02K 5/15* (2013.01); *H02K 9/197* (2013.01); *H02K 21/14* (2013.01);
(Continued)

(58) Field of Classification Search
CPC .................................. H02K 5/15; H02K 5/20
See application file for complete search history.

(56) References Cited

U.S. PATENT DOCUMENTS

| | | | | |
|---|---|---|---|---|
| 3,588,556 A | * | 6/1971 | Guzman et al. | H02K 9/02 310/85 |
| 3,805,101 A | * | 4/1974 | Purman | H02K 9/20 62/505 |

(Continued)

FOREIGN PATENT DOCUMENTS

| | | |
|---|---|---|
| EP | 1215418 A1 | 6/2002 |
| EP | 1727263 A2 | 11/2006 |

(Continued)

OTHER PUBLICATIONS

International Search Report and Written Opinion for International Application No. PCT/US2020/046763 dated Nov. 16, 2020.
(Continued)

*Primary Examiner* — Bernard Rojas
(74) *Attorney, Agent, or Firm* — Harness, Dickey & Pierce, P.L.C.

(57) ABSTRACT

An electric machine includes a housing, a stator assembly within the housing, a rotor assembly within the housing, and a dam assembly including a first dam element. The first dam element is arranged on one end of the electric machine. The first dam element includes an air inlet. The air inlet is configured to receive a supply of pressurized air.

22 Claims, 9 Drawing Sheets

(51) Int. Cl.
*H02K 5/15* (2006.01)
*H02K 9/197* (2006.01)
*H02K 21/14* (2006.01)

(52) U.S. Cl.
CPC .......... *B60K 1/00* (2013.01); *B60K 2001/006* (2013.01); *H02K 2205/09* (2013.01); *H02K 2205/12* (2013.01)

(56) References Cited

U.S. PATENT DOCUMENTS

| | | | |
|---|---|---|---|
| 4,274,021 | A | 6/1981 | Kamiya et al. |
| 4,600,848 | A | 7/1986 | Sutrina et al. |
| 7,160,086 | B2 | 1/2007 | Maceyka et al. |
| 7,538,457 | B2 | 5/2009 | Holmes et al. |
| 9,246,369 | B2 | 1/2016 | Tamai et al. |
| 2002/0180284 | A1 | 12/2002 | LeFlem et al. |
| 2016/0276902 | A1* | 9/2016 | Heidebrink ............ H02K 5/207 |

FOREIGN PATENT DOCUMENTS

| | | |
|---|---|---|
| EP | 2601730 B1 | 7/2014 |
| EP | 3193434 A1 | 7/2017 |
| GB | 320563 A | 10/1929 |
| JP | H0192048 A | 4/1989 |
| WO | WO-95/24762 A1 | 9/1995 |
| WO | WO-2005/099070 A1 | 10/2005 |
| WO | WO-2010/055757 A1 | 5/2010 |
| WO | WO-2018/098567 A1 | 6/2018 |

OTHER PUBLICATIONS

International Preliminary Report on Patentability issued in PCT/US2020/046763 dated Mar. 3, 2022.

Written Opinion for International Application No. PCT/EP2005/051533.

* cited by examiner

ELECTRIC MACHINE WITH INTEGRATED DAM ASSEMBLY

CROSS-REFERENCE TO RELATED APPLICATIONS

This application is the national phase application under 35 U.S.C. § 371 of PCT International Application No. PCT/US2020/046763 which has an late national filing date of Aug. 18, 2020, which claims priority under 35 U.S.C. § 119(e) to U.S. Provisional Application No. 62/889,540 filed in the U.S.P.T.O. on Aug. 20, 2019, the entire contents of each of which are herein incorporated by reference.

FIELD OF THE DISCLOSURE

Some non-limiting example embodiments relate generally to electric machine cooling systems, and, more particularly, to an electric machine having an integrated dam assembly to facilitate increased cooling.

BACKGROUND OF THE DISCLOSURE

In high performance electric machine applications, effective thermal management may be a factor in machine performance. Increased power densities of electric machines have led to increases in heat densities, resulting in thermal conditions that may be undesirable. For example, excessive heat generation that results from losses within the stator windings, laminations, and/or magnets may be distributed to a variety of machine components. The excessive heat generation may cause adverse temperature effects. These temperature effects may include magnet demagnetization, component failure and/or insulation damage of the machine.

To address such concerns and to enhance thermal designs of the electric machines, a variety of cooling techniques have been employed.

SUMMARY OF THE DISCLOSURE

According to some example embodiments, an electric machine includes a dam assembly to facilitate increased heat transfer and cooling.

According to some example embodiments, an electric machine includes a housing, a stator assembly within the housing, a rotor assembly within the housing, and a dam assembly including a first dam element. The first dam element is arranged on one end of the electric machine. The first dam element includes an air inlet. The air inlet is configured to receive a supply of pressurized air.

Other features and aspects will become apparent by consideration of the detailed description and accompanying drawings.

BRIEF DESCRIPTION OF THE DRAWINGS

The detailed description of the drawings refers to the accompanying figures in which.

Unless otherwise specified, like reference numerals are used to indicate like elements throughout the several figures.

DETAILED DESCRIPTION OF SOME EXAMPLE EMBODIMENTS

According to some example embodiments, the stator assembly at least partially surrounds the rotor assembly with a rotor-stator air gap between the stator assembly and the rotor assembly, and the pressurized air flows in the rotor-stator air gap.

According to some example embodiments, the rotor assembly at least partially surrounds the dam assembly with a rotor-dam air gap between the rotor assembly and the dam assembly, and the pressurized air flows in the rotor-dam air gap.

According to some example embodiments, the first dam element includes a cable port proximate to the air inlet, the cable port having a size to receive at least one cable, the at least one cable connected to the electric machine.

According to some example embodiments, the first dam element includes an outer surface comprising a mound, at least one of a height or a width of the mound, based on at least one of a size or a length of an end turn of the stator assembly.

According to some example embodiments, the first dam element includes an inner portion including a surrounding wall, the surrounding wall recessed from a surface of the outer portion.

According to some example embodiments, the rotor assembly includes a rotor shaft configured to rotate around an axis, and at least two plates, the at least two plates arranged on opposing ends of the rotor assembly.

According to some example embodiments, the rotor assembly further includes a plurality of cavities having a size to receive a permanent magnet.

According to some example embodiments, the first dam element is arranged at a non-drive end of the electric machine.

According to some example embodiments, the first dam element is arranged at a drive end of the electric machine.

According to some example embodiments, the electric machine further includes an end shield having at least one hole to receive a supply coolant, the supply coolant surrounding one or more end turns within the stator assembly.

According to some example embodiments, the one or more end turns are submerged in the supply coolant.

According to some example embodiments, the supply coolant is transmission fluid.

According to some example embodiments, the dam assembly further comprises a second dam element arranged at another end of the electric machine, and the electric machine further includes an end shield having at least one hole at least one end of the electric machine to receive a supply coolant, the supply coolant surrounding one or more end turns within the stator assembly.

According to some example embodiments, the one or more end turns are submerged in the supply coolant.

According to some example embodiments, a gap between the rotor assembly and the dam assembly includes an air pocket to restrict the flow of the pressurized air.

According to some example embodiments, a gap between the rotor assembly and the stator assembly includes an air pocket through which the pressurized air flows.

According to some example embodiments, the rotor assembly is configured to rotate in response to a mechanical torque, and the stator assembly is configured to generate an electrical signal in response to the mechanical torque received at the rotor assembly.

According to some example embodiments, the stator assembly is configured to receive an electrical signal, and the rotor assembly is configured to rotate in response to the electrical signal received at the stator.

According to some example embodiments, at least one of the pressurized air affects an amount of supply coolant entering a rotor-stator air gap between the rotor assembly and the stator assembly by creating a first air bubble in the rotor-stator air gap, or the pressurized air affects an amount of supply coolant entering a rotor-dam air gap between the rotor assembly and the dam assembly by creating a second air bubble in the rotor-dam air gap.

According to some example embodiments, at least one of, the pressurized air blows supply coolant away from a rotor-stator air gap between the rotor assembly and the stator assembly, or the pressurized air blows supply coolant away from a rotor-dam air gap between the rotor assembly and the dam assembly.

According to some example embodiments, the air inlet is sized to provide approximately 3 liters per minute (lpm) of pressurized air.

According to some example embodiments, a work vehicle includes a transmission configured to control power to the work vehicle, and an electric machine operatively coupled to the transmission, the electric machine comprising a stator assembly, a rotor assembly, and a dam assembly, the dam assembly comprising a first dam element including an air inlet. The dam assembly is configured to introduce a supply of pressurized air through the air inlet in the first dam element.

According to some example embodiments, the stator assembly at least partially surrounds the rotor assembly with a rotor-stator air gap between the stator assembly and the rotor assembly, and the pressurized air flows in the rotor-stator air gap.

According to some example embodiments, the rotor assembly at least partially surrounds the dam assembly with a rotor-dam air gap between the rotor assembly and the dam assembly, and the pressurized air flows in the rotor-dam air gap.

According to some example embodiments, the first dam element comprises a cable port proximate to the air inlet, the cable port having a size to receive at least one cable, the at least one cable connected to the electric machine.

According to some example embodiments, the first dam element comprises an outer portion comprising a mound, at least one of a height or a width of the mound based on at least one of a size or a length of an end turn of the stator assembly.

According to some example embodiments, the first dam element includes an inner portion including a surrounding wall, the surrounding wall recessed from the outer surface.

According to some example embodiments, the rotor assembly includes, a rotor shaft configured to rotate around an axis, and at least two plates, the at least two plates arranged on opposing ends of the rotor assembly.

According to some example embodiments, the first dam element is arranged at a non-drive end of the electric machine.

According to some example embodiments, the first dam element is arranged at a drive-end of the electric machine.

According to some example embodiments, the electric machine further comprises an end shield having at least one hole to receive a supply coolant, the supply coolant surrounding a plurality of end turns of the stator assembly.

According to some example embodiments, the dam assembly further comprises a second dam element arranged on one end of the rotor assembly, and the electric machine further comprises an end shield having at least one hole to receive a supply coolant, the supply coolant surround a plurality of end turns of the stator assembly.

According to some example embodiments, a method includes providing a stator assembly and a rotor assembly within a housing, arranging a dam assembly within the housing, the dam assembly arranged relative to the stator assembly and the rotor assembly, the dam assembly comprising a first dam element and a second dam element arranged on opposing ends of the stator assembly and the rotor assembly, and introducing a supply of pressurized air through an air inlet in the first dam element, the pressurized air affecting a heat flow between the stator assembly and the rotor assembly.

According to some example embodiments, the method further includes introducing a supply coolant into the dam assembly, the supply coolant surrounding one or more of end turns of the stator assembly.

According to some example embodiments, the introducing the supply of pressurized air occurs before the introducing the supply coolant.

According to some example embodiments, the method further includes rotating the rotor assembly.

According to some example embodiments, the supply coolant is transmission fluid.

According to some example embodiments, an electric machine includes a housing, a stator assembly within in the housing, the stator assembly including end turns, a rotor assembly within the housing, the rotor assembly comprising a rotor shaft, a dam assembly comprising a first dam element, the first dam element arranged on one end of the stator assembly, and an end shield having a plurality of holes to receive a supply coolant, the supply coolant surrounding one or more end turns within the stator assembly.

Figure 1:
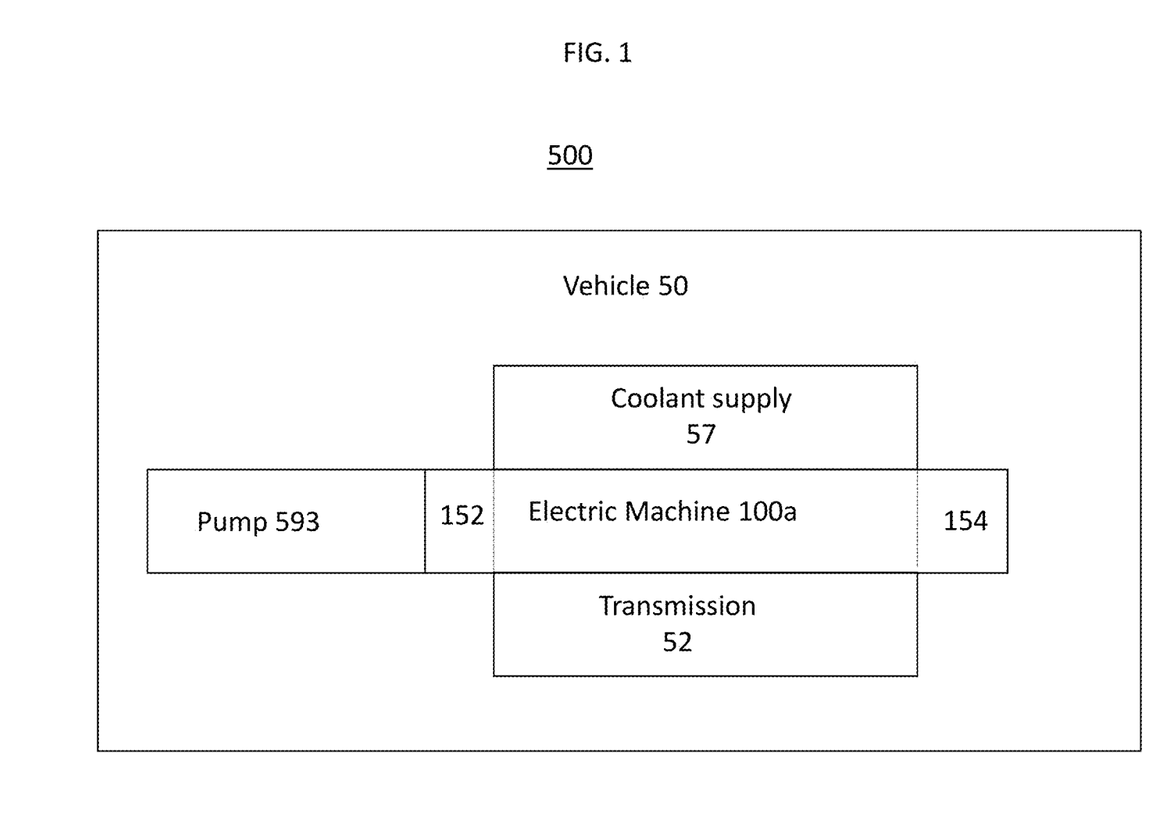
FIG. 1 is a schematic illustrating a system including an electric machine, according to some example embodiments.

FIG. 1 illustrates a system having a vehicle with the electric machine, according to some example embodiments.

Referring to FIG. 1, a system 500 may include a vehicle, such as work vehicle 50 described below in more detail.

The work vehicle 50 may include a transmission, such as the transmission 52 described below in more detail. The transmission 52 may be operatively coupled to an electric machine, such as electric machine 100a described below.

There may be a fluid supply, such as coolant supply 57. The coolant supply 57 may supply a coolant, such as a transmission fluid, to the electric machine 100a and/or other components of the vehicle 50.

Included within, or adjacent to, the electric machine 100a, there may be dam elements, such as first dam element 152 described below, and second dam element 154 described below.

At least one of the dam elements, such as dam element 150a, may be connected to a pump, such as air pump 593.

The air pump 593 may supply air to the electric machine 100a through the first dam element 152, and the air supplied by the air pump 593 may exit through the second dam element 154. The air supplied by the air pump 593 may cool components of the electric machine 100a, such as stator assemblies and/or rotor assemblies.

Alternatively or additionally, fluid supplied from the coolant supply 57 may surround and/or submerge components, such as end turns of the stator assemblies included in the electric machine 100a. The fluid supplied may cool components of the electric machine 100a.

When air is supplied by the air pump 593, air pockets may be created around components of the electric machine 100a, for example in gaps between the stator assembly and the rotor assembly. Accordingly when coolant is also supplied by the coolant supply 57, coolant may not enter air pockets. The coolant may, instead, be directed around and/or submerge other components of the electric machine 100a, such as end turns of the stator assembly included in the electric machine 100a.

Figure 2:
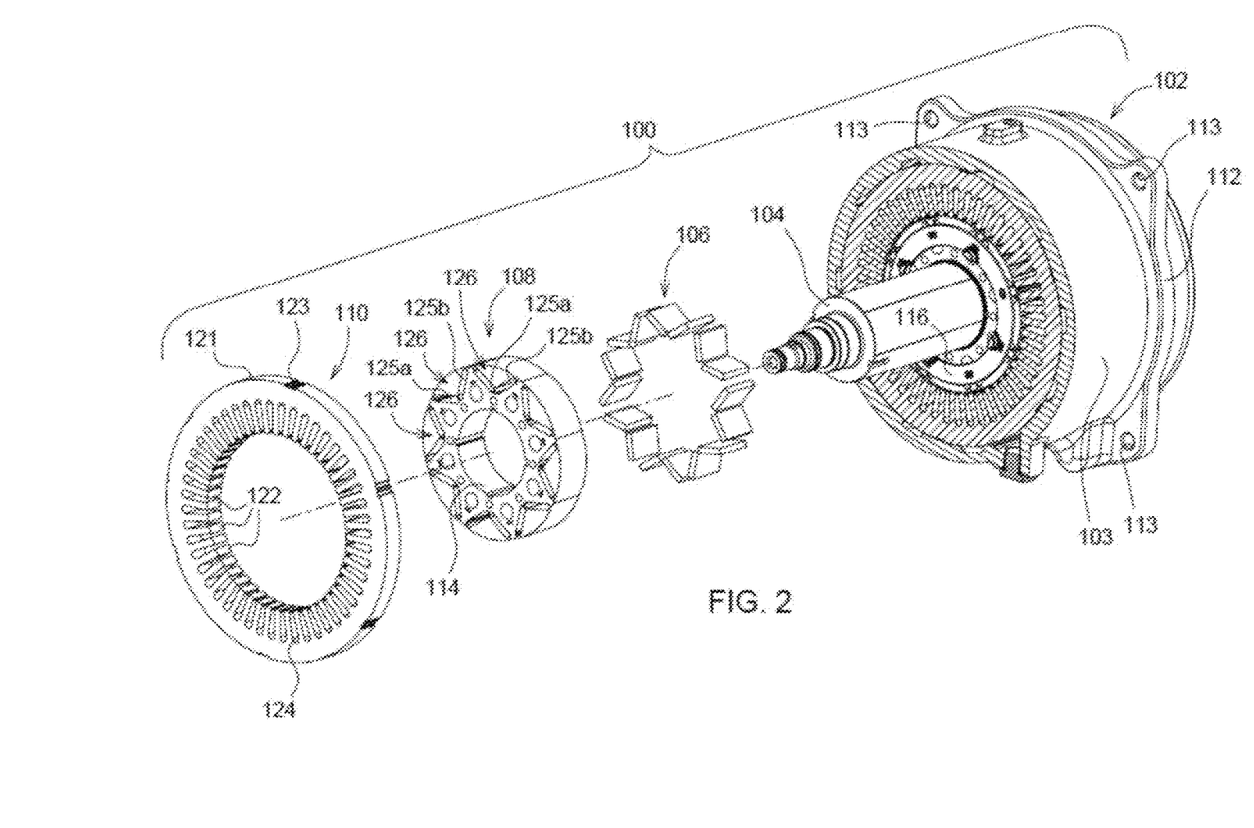
FIG. 2 is an exploded perspective view of an electric machine according to some example embodiments.
Figure 3:
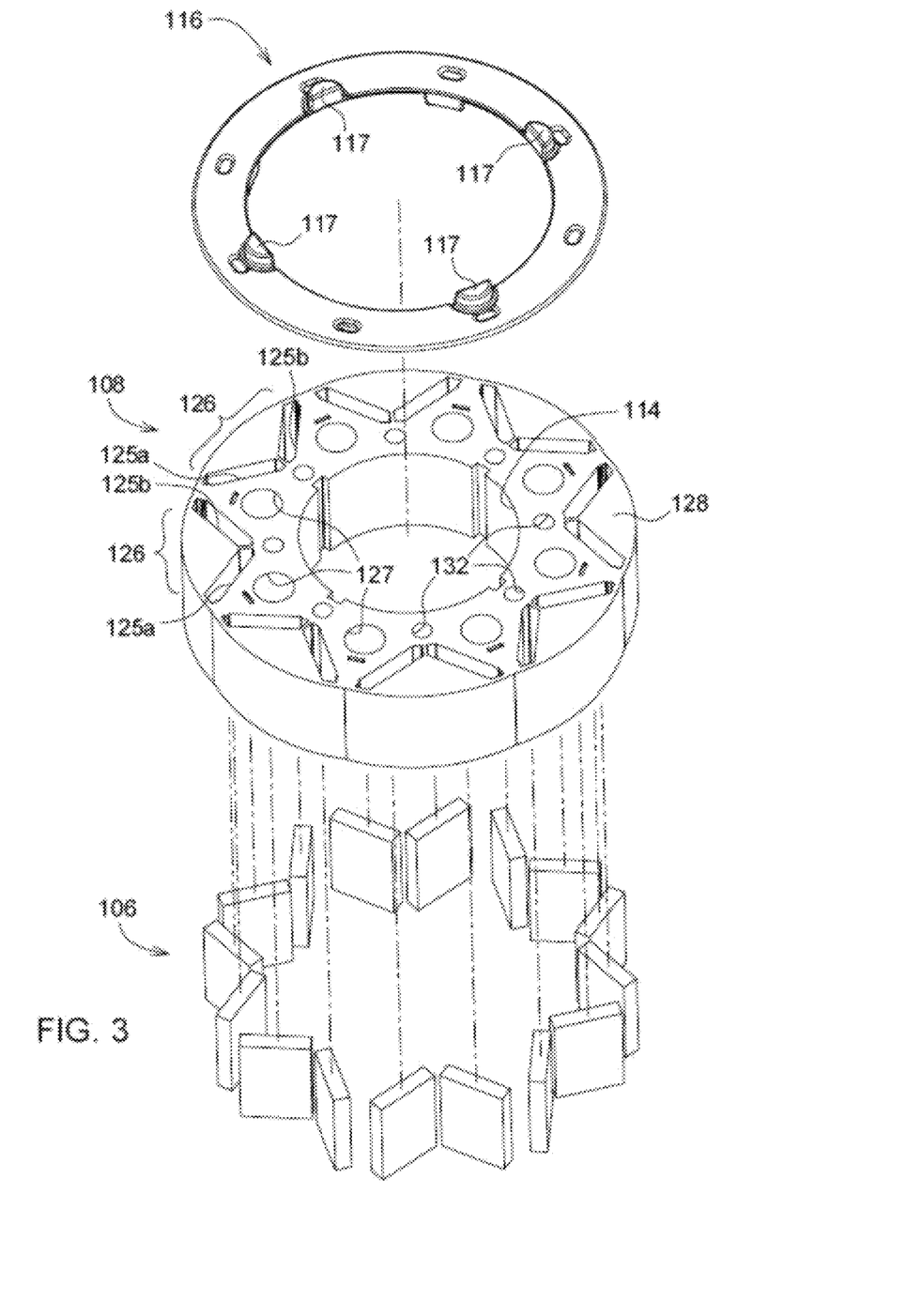
FIG. 3 is an exploded perspective view of a rotor assembly arranged in the electric machine according to some example embodiments.

Referring now to FIGS. 2-3, an electric machine 100 may comprise a housing 102 along with a stator assembly 110 and a rotor assembly 108. The housing 102 may comprise an outer cylindrical surface 103 having a mounting interface 112 removably coupled to or, alternatively, integrally formed therein. Although in FIG. 2, the mounting interface 112 is shown as comprising a plurality of mounting holes 113 which are sized to receive one or more fasteners and/or similar connectors, example embodiments are not limited thereto. For example, the mounting interface 112 can comprise a variety of coupling features and mechanisms based on the electric machine 100 design.

In some example embodiments, the stator assembly 110 may comprise a plurality of stator laminations adjacently arranged to define a stator core (not shown), with each having generally cylindrical configurations. Alternatively or additionally, the stator assembly 110 may comprise a solid and/or split core element, with FIG. 2 being but one example embodiment.

As shown in FIG. 2, the stator assembly 110 may comprise a number n of slots 122 circumferentially spaced and aligned about an inner surface 124 (n is an integer), with each of the n slots 122 being dimensioned and sized to accommodate one or more motor windings (e.g., coil windings) that extend from the slots 122 to form end turns (for example, as described below with reference to FIGS. 5A-6B). In some example embodiments, one or more weld structures 123 may be formed in and/or arranged on an outer surface 121 of the stator assembly 110. The weld structures 123 may provide a more secure bonding connection between the stator laminations.

As shown in FIG. 2, the rotor assembly 108 may comprise a rotor shaft 104. Additionally as shown in FIG. 3, the rotor assembly 108 may further comprise one or more field generation structures 126 that are spaced, e.g. equidistantly spaced and arranged, e.g. symmetrically arranged relative to one another, for example about each rotor lamination. The one or more field generation structures 126 may comprise at least two slots 125a, 125b that are sized to receive one or more magnetic elements 106 (e.g., permanent magnets). The magnetic elements 106 may be made of and/or include many materials, such as but not limited to be at least one of ferritic material, NdFeB material, and/or samarium cobalt.

In some non-limiting example embodiments as in FIG. 2, the slots 125a, 125b can be arranged in a generally v-shaped configuration to allow for the placement of each of the magnetic elements 106 in alternating polarity for the inducement of an alternating magnetic field.

The rotor assembly 108 may rotate in response to an electrical signal (e.g. an AC signal) provide to the stator assembly 110. For example, the electric machine 100 may operate as a motor. Alternatively or additionally, the rotor assembly 108 may rotate in response to a mechanical torque provided to the rotor assembly 108, and the stator assembly 110 may generate an electrical signal (e.g. an AC signal) in response to the rotation of the rotor assembly 108. For example, the electric machine 100 may operate as a generator.

In some example embodiments, a spacer disk 116 may be integrally and/or removably coupled to an end face 128 of one or more of the rotor laminations. The spacer disk 116 may comprise a plurality of coupling elements 117 that are designed for mating engagement with spacer receiving openings 134 arranged in or on the end face 128.

Referring to FIG. 3, there may be a plurality of large holes 127, and a plurality of small holes 132, in the end face 128. The plurality of large holes 127 and/or the plurality of small holes 132 may mate with other components of the electric machine 100. The plurality of large holes 127 and/or the plurality of small holes 132, may help to reduce inertia of the rotor assembly 108. With the plurality of large holes 127 and/or the plurality of small holes 132, the rotor shaft 104 may accelerate and/or decelerate more quickly. The plurality of large holes 127 and/or the plurality of small holes 132 may also help to cool the rotor assembly 108 and/or the magnetic elements 106, for example if either or both of air or other coolant flows through the holes.

The spacer disk 116 may be used to divert coolant and/or oil to either or both ends of the rotor assembly 108.

As shown in FIG. 3, the spacer disk 116 may be concentrically arranged relative to the rotor shaft 104 and positioned such that a portion, e.g. a majority portion of each of the field generation structures 126 is covered by the spacer disk 116. Although in some example embodiments herein, the spacer disk 116 is shown as including a generally circular configuration, example embodiments are not limited thereto, and the geometrical configuration of the spacer disk 116 can vary.

Performance of an electric machine may be affected by, for example, heat generated around end turns of a stator assembly. End turns may be cooled, e.g. may be cooled with a coolant such as an oil such as transmission fluid. However, allowing for the coolant to enter into gaps between a rotor and a stator may cause windage loss and/or may cause a high friction, leading to, for example, energy loss due to a high rotation rate of the rotor.

If coolant such as transmission fluid surrounds end turns of a stator assembly without, or with a minimal risk, of coolant causing energy loss due to high friction, performance of an electric machine may be improved. For example, an amount of torque provided by the electric machine may be increased. Alternatively or additionally, performance requirements of magnets used in the electric machine may be reduced.

Figure 4:
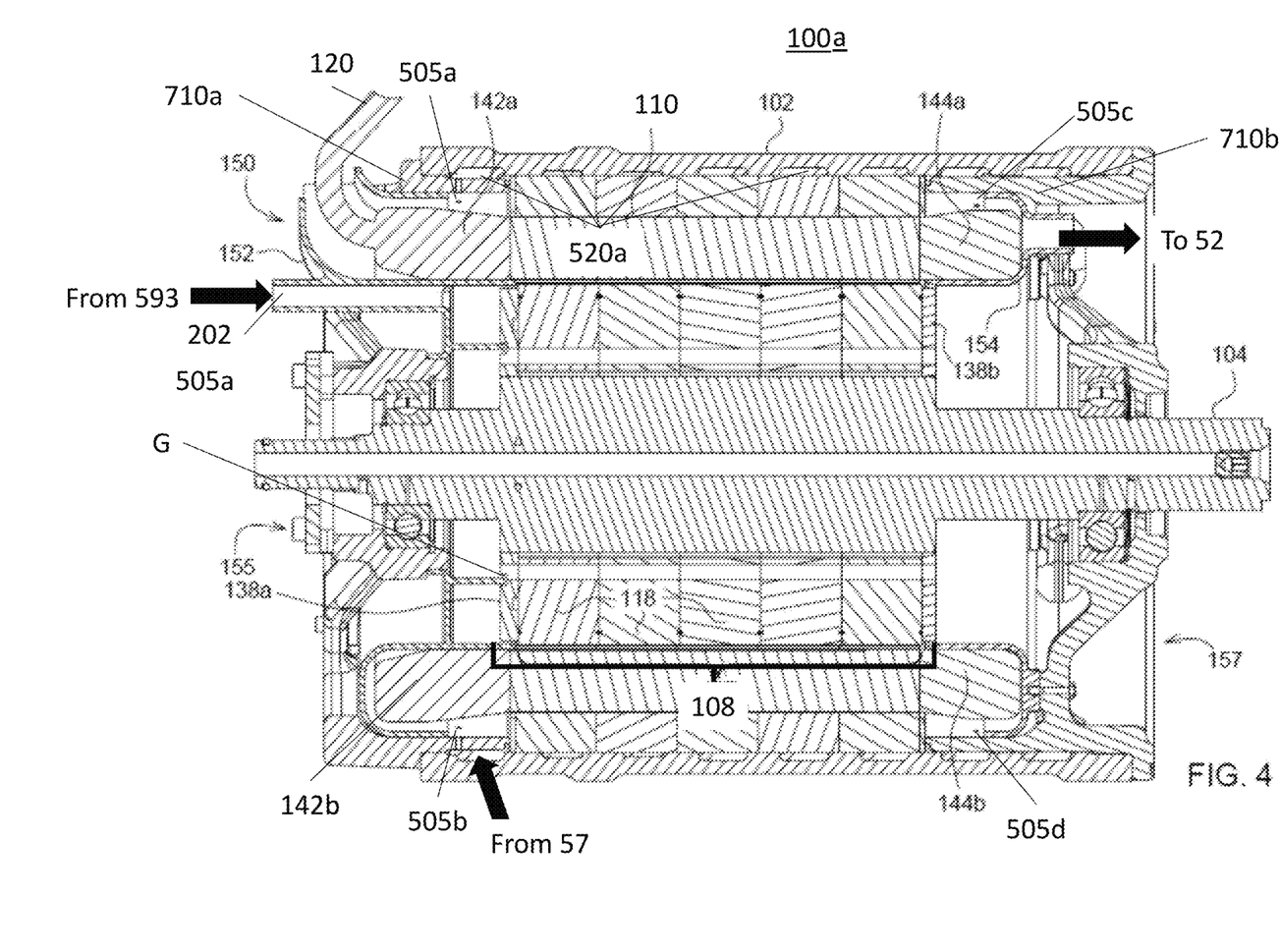
FIG. 4 is a side cross-sectional view of an electric machine according to some example embodiments.

Referring now to FIG. 4, an electric machine 100a may include features similar to those discussed above with reference to FIGS. 2 and 3, and similar descriptions may be omitted for brevity.

The electric machine 100a may include and/or have a stator assembly 110. The stator assembly 110 may have coils having end turns 142a, 142b, 144a, 144b. Additionally the electric machine 100a may have and/or include a rotor assembly 108. The rotor assembly 108 may have or include a rotor shaft 104. The rotor assembly 108 may include a plurality of rotor laminations 118.

Furthermore the electric machine 100a may include and/or have a dam assembly 150. The dam assembly 150 may facilitate increased cooling of heat of the electric machine 100a, as shown according to some example embodiments. The electric machine 100a may be arranged to extend between an end opposite of the rotor shaft 104 and an ear the rotor shaft 104. For example, the electric machine 100a may be arranged to extend from a front-end/outboard end, e.g. non-drive end 155 to a back end/inboard end, e.g. drive end 157.

In some example embodiments, a cooling assembly may be arranged within the rotor assembly 108. For example, as illustrated in FIG. 4, at least two plates 138a, 138b (e.g., end plates or cooling plates) can be arranged at opposing ends of the rotor assembly 108. Either or both of the plates 138a and 138b may apply even pressure to laminations at the ends of the rotor assembly 108. There may be a groove G within the cooling plate 138a.

When magnetic elements 106 are cooled, for example by the flow of air and/or by the flow of oil, there may be an increase in magnetic flux. Accordingly, there may be less electrical current used, thus increasing the efficiency of the electric machine 100.

Additionally referring to FIG. 4, the rotor shaft 104 can be rotationally mounted within the rotor assembly 108 to allow for the rotor shaft 104 to be rotated relative to the stator assembly 110 during operation.

The dam assembly 150 may be arranged within the housing 102 at opposing ends of the electric machine 100a. In some example embodiments, the dam assembly 150 may comprise a first dam element 152 spatially arranged relative to a second dam element 154. The first dam element 152 and/or the second dam element 154 may be composed of metal and/or plastic. The first dam element 152 and the second dam element 154 will be discussed in further detail with reference to FIGS. 5A-6B. The first dam element 152 and the second dam element 154 may not be connected to one another, e.g. the first dam element 152 may be separate from the second dam element 154; however, example embodiments are not limited thereto.

The dam assembly 150 may be arranged to direct a flow of coolant, such as a supply coolant and/or other suitable fluids such as a transmission oil, around the winding coils and end turns 142a, 142b, 144a, 144b of the electric machine 100a. Furthermore, according to some example embodiments, end turns 142a, 142b, 144a, 144b may be cooled in a manner that reduces (e.g. minimizes) the amount of coolant that flows into a rotor-stator air gap and/or a rotor-dam air gap.

Still referring to FIG. 4, there may be cabling 120 connected to at least one of the end turns, e.g. to end turn 142a. The cabling 120 may connect the electric machine 100 to other electrical components, such as an inverter (not shown). The cabling 120 may exit from an opening within either or both the first dam element 152 or the second dam element 154.

Furthermore there may be a dam inlet 202 near one end, e.g. the non-drive end 155 of the electric machine 100a. The dam inlet 202 may be sized to receive a supply of air, e.g. pressurized air. The air may be pumped into the dam inlet 202, e.g. supplied by a pump (not shown). The pump may be a component of the work vehicle 50 described above with reference to FIG. 1. For example, the pump may be or correspond to pump 593 discussed above with reference to FIG. 1.

Still further, there may be channels such as a channel 520a between the housing 102 and components of the electric machine 100a, such as the end shield 710a. The channels may spiral around the electric machine 100a. The channels may receive a supply of a lubricant and/or a coolant, to be described below in more detail. Lubricant and/or coolant may flow around the spiral channels, such as channel 520a. There may be at least one hole (not illustrated) in the housing 102, and the channel 520a may be in fluid communication with a fluid supply, such as the coolant supply 57 described above with respect to FIG. 1.

Although FIG. 4 illustrates that the dam inlet 202 is near the non-drive end 155 of the electric machine 100a, example embodiments are not limited thereto, and the dam inlet 202 may be near the drive end 157 of the electric machine 100a.

Still further there may be end shields 710a, 710b on ends of the electric machine 100a. Within the end shields 710a, 710b, there may be a number of small holes 505a, 505b, 505c, 505d. The small holes 505a, 505b, 505c, 505d may be arranged consecutively and evenly around the end shields 710a, 710b; however, example embodiments are not limited thereto.

The small holes 505a, 505b, 505c, 505d may receive a coolant, such as a transmission fluid. The small holes 505a, 505b, 505c, 505d may be arranged within the near the end turns 142a, 142b, 144a, 144b. The small holes 505a, 505b, 505c, 505d may direct coolant around the end turns 142a, 142b, 144a, 144b.

A diameter of at least one of the small holes 505a, 505b, 505c, 505d may be 2 mm; however, example embodiments are not limited thereto. A number of small holes 505a, 505b, 505c, 505d may not be limited to those illustrated in the figures. For example, a number of holes may be twenty or more within either or both of the end shield 710a, 710b, e.g. may be twenty four. The size/diameter, and/or the number of small holes 505a, 505b, 505c, 505d, and/or the placement of the small holes 505a, 505b, 505c, 505d may be based on a size of the electric machine 110a.

The coolant may partially or fully surround the end turns 142a, 142b, 144a, 144b of the stator assembly 110. The end turns 142a, 142b, 144a, 144b may be partially or fully submerged in coolant. The coolant may be supplied from a coolant-supply source, e.g. the coolant supply 57 discussed above with reference to FIG. 1. The coolant may exit the electric machine 100 at or near a transmission (e.g. transmission 52 described with reference to FIG. 1).

As will be appreciated by those of ordinary skill in the art, FIGS. 1-4 are provided for illustrative and example purposes only and are in no way intended to limit some example embodiments or its applications. For example, the arrangement and/or structural configuration of the electric machine 100 and/or dam assembly 150 can vary. For example, in some example embodiments, the positional arrangement of the dam assembly 150 can vary based on machine size (e.g., 180 mm vs 120 mm). Additionally or alternatively, the internal circuitry and component arrangement of the electric machine 100 can vary according to design and/or specification requirements.

Referring now to FIGS. 5A-6B a more detailed view of the first dam element 152 and the second dam element 154 in relation to other components of the electric machine 100a is shown. In some example embodiments, the first dam element 152 may be arranged at the non-drive end 155 of the electric machine 100a, and may have an inner surface 204 integrally formed with an outer surface 203. The first dam element 152 may comprise a mound 217 formed therein that is sized to accommodate the end turns 142a, 142b. For example, a height and/or a width of mound 217 may be defined based on a size and/or length of the end turns 142a, 142b. The first dam element 152 may include a surrounding wall 208 that partially surrounds portions of the end turns 142a, 142b.

Figure 5A:
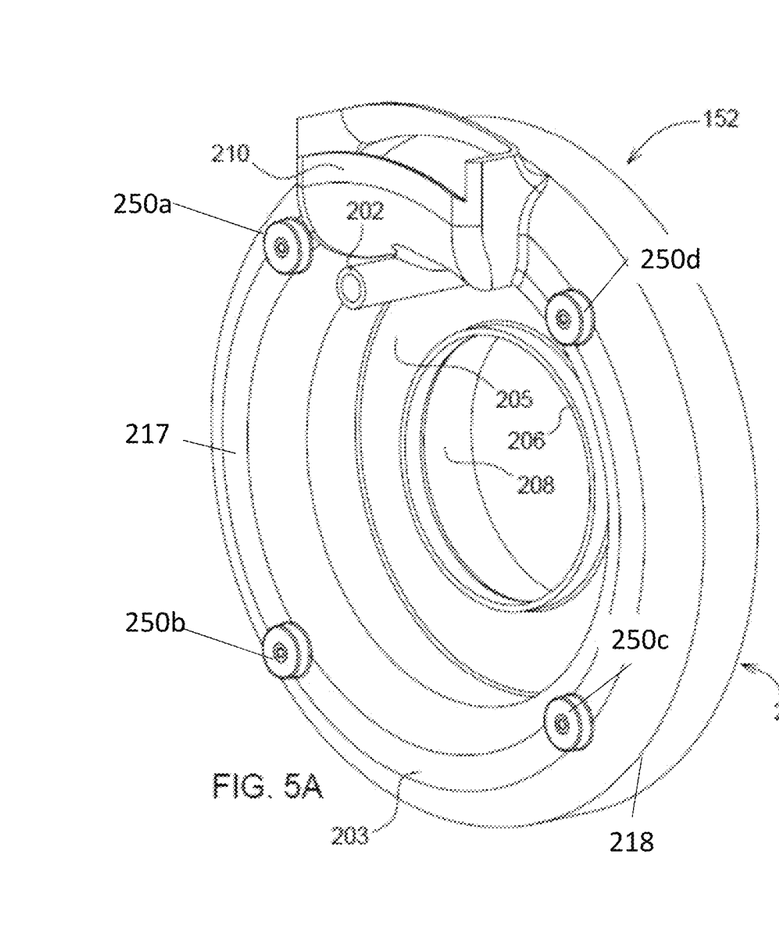
FIG. 5A is a perspective view of a dam element arranged within the electric machine of FIG. 4 according to some example embodiments.

The first dam element 152 may have an inner wall 206 that is sized to accommodate the rotor shaft 104.

The first dam element 152 may include a number of connection areas 250a, 250b, 250c, 250d. The connection areas 250a, 250b, 250c, 250d may be arranged to secure the first dam element 152 to other components of the electric machine 100a. For example, the first dam element 152 may be secured to the electric machine 100a through a number of screws arranged in the connection areas 250a, 250b, 250c, 250d. Although four connection areas are illustrated, example embodiments are not limited thereto.

Figure 5B:
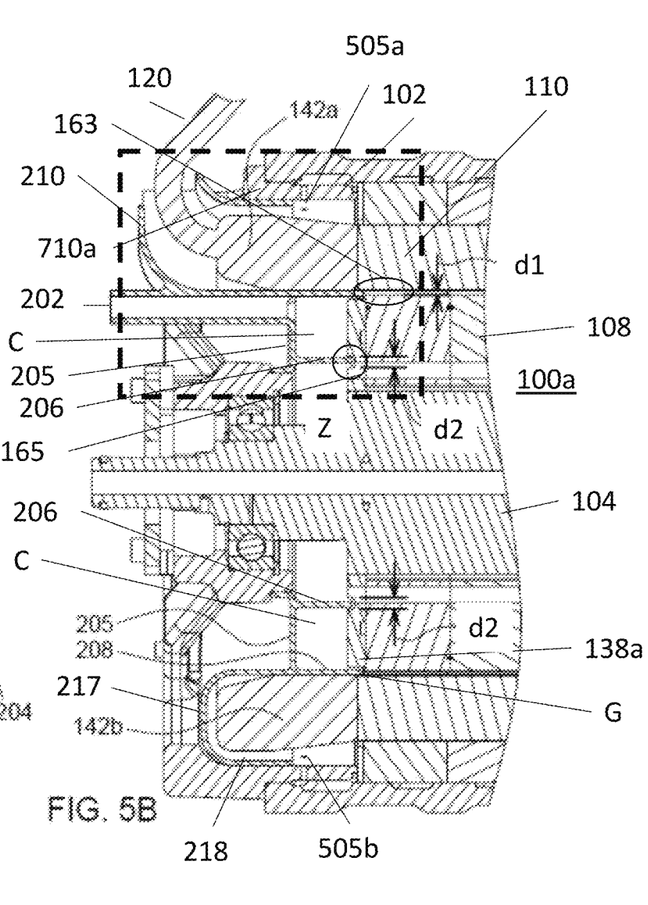
FIG. 5B is a partial cross-sectional side view of an end of the electric machine of FIG. 4 according to some example embodiments.

As illustrated in FIGS. 5A and 5B, the first dam element 152 may mate and/or join with other components of the electric machine 100a. For example, the mound 217 may enclose the end turns 142a, 142b. A wall 205 in the first dam element 152 may have a first surface exposed to air, e.g. to atmospheric air, and a second surface exposed to other air, e.g. to pressurized air supplied from a pump connected to dam inlet 202. The surrounding wall 208 may extend around a portion of the end turns, e.g. a portion of end turn 142b. There may be a cavity C between the surrounding wall 208 and the wall 205. The cavity C may have a slight positive pressure therein, when pressurized air is input through the dam inlet 202.

As shown in FIG. 5B, a rotor-stator air gap 163 may be formed between the stator assembly 110 and the rotor assembly 108, and a rotor-dam air gap 165 can be formed between the first dam element 152 and the rotor assembly 108. The rotor-stator air gap 163 and/or the rotor-dam air gap 165 may form annuli. For example, an annulus may be formed between the rotor assembly 108 and the stator assembly 110, and/or an annulus may be formed between the rotor assembly 108 and the dam assembly 150. A hydraulic diameter d1 is about 1 for the rotor-stator air gap 163, and a hydraulic diameter d2 of the rotor-dam air gap is about 0.5; however example embodiments are not limited thereto, and the rotor-dam air gap 165 may be much shorter in some example embodiments.

The plate 138a may include the groove G, e.g. a cutout therein. The surrounding wall 208 connect to the cooling plate 138a within the groove G of the cooling plate 138a. The groove G may help stabilize a connection between the first dam element 152 and the plate 138a.

The dam inlet 202 may be arranged proximate a cable port 210. The cable port 210 may be sized to receive various cabling, such as cabling 120 described with reference to FIG. 4, and/or terminal connections for example to and from other electrical components such as an inverter (not illustrated). The cable port may be at an upper end of the first dam element 152. Furthermore although in FIG. 5A, the dam inlet 202 is shown as being arranged at the upper end of the first dam element 152, the length, location, and/or arrangement of the dam inlet 202 can vary, and example embodiments are not limited thereto. For example, the dam inlet 202 can be arranged at a lower end of the first dam element 152.

The dam inlet 202 may be sized to provide approximately 3 liters per minute (lpm) of air. For example, air supplied through the dam inlet 202 will flow through the air gaps 163, 165. Furthermore, air supplied into the air gaps 163, 165 may create air pockets/air bubbles that inhibit or reduce an amount of coolant that enters into the air gap. The dam inlet 202 may be connected to a pump (not shown), which may provide approximately 3 lpm of pressurized air to the electric machine 100.

Air, such as pressurized air flowing within the electric machine 100a, may enable the electric machine 100a to run cooler, and/or at a higher rate of rotation. The pressurized air may also reduce losses in the air gaps 163, 165.

Figure 5C:
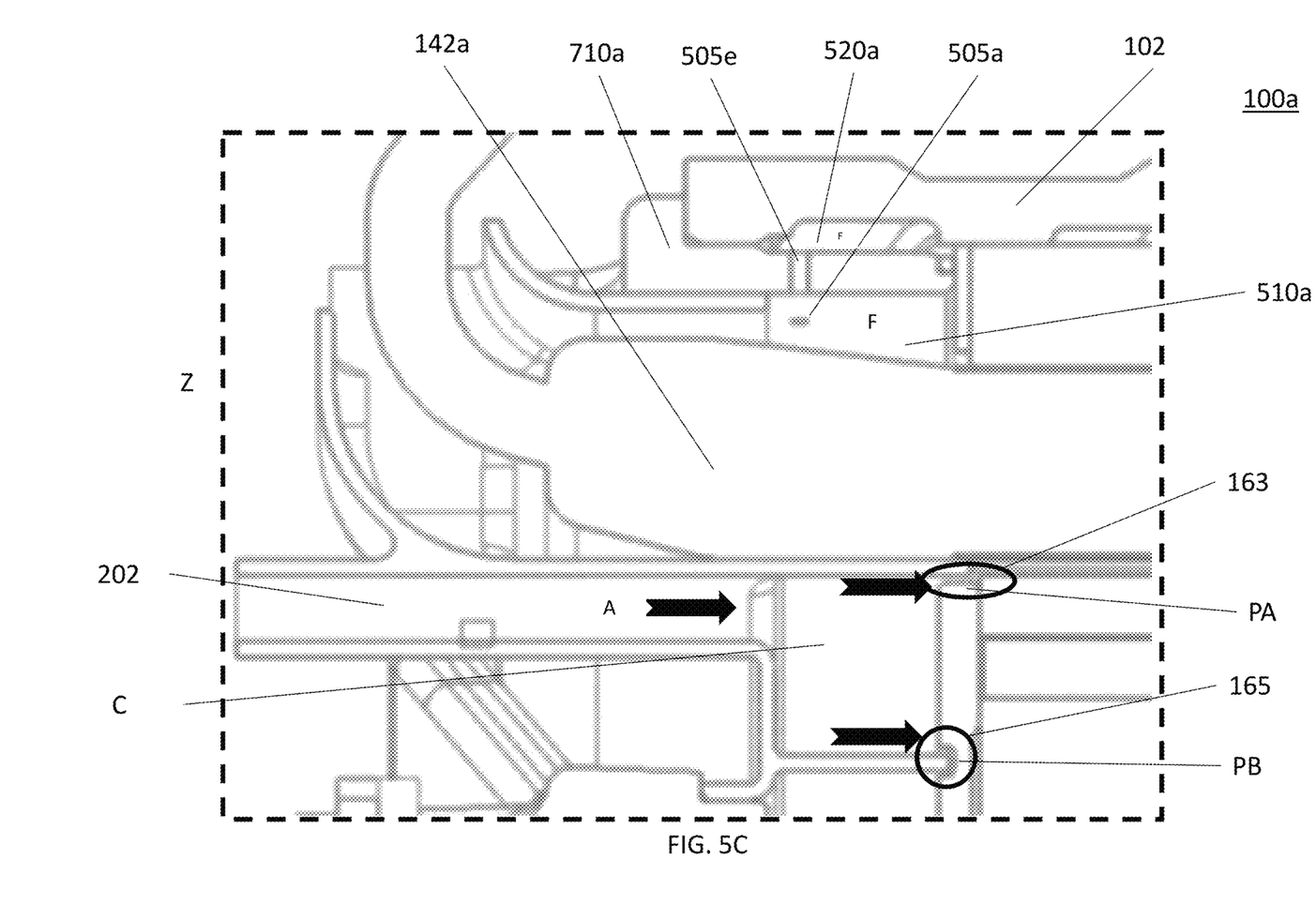
FIG. 5C is a zoom-in of FIG. 5B in a region labeled "Z" according to some example embodiments.

As shown in FIG. 5C, there may be channels, such as channel 520a, between the housing 102 and other components of the electric machine 100a such as the end shield 710. The channels 520a may be contiguous and may spiral around the electric machine 100a.

The housing 102 may be surrounded in a coolant, such as transmission fluid F, and the transmission fluid F may enter into the channel 520, e.g. may enter in the channel 520 through a hole (not shown) in the housing 102.

There may be a cavity 510a between the end shield 710 and the end turns, such as end turn 142a. The transmission fluid F, may enter into the cavity 510a from at least one small hole 505a, 505e within the end shield 710. The fluid F may surround the end turn 142a. The cavity 510a may be in fluid communication with the channel 520a, such that the fluid F may enter through at least one small hole such as small hole 505a, 505e.

Because air A is pumped in from dam inlet 202, an air pocket PA may be formed in the rotor-stator air gap 163, and/or an air pocket PB may be formed in the rotor-dam air gap 165.

The fluid F may be inhibited, or reduced in likelihood of occurrence, from entering into the rotor-stator air gap 163 and/or the rotor-dam air gap 165. The end turn 142a may be cooled by the fluid F, and/or the rotor shaft 104 illustrated in FIG. 5B may be operated at a high speed without or with a reduced risk of energy loss caused by friction of the coolant F.

If fluid F, e.g. a significant amount of fluid F, were to enter the rotor-stator air gap 163 and/or the rotor-dam air gap 165, the fluid F may experience a high rate of friction, e.g. friction created by the rotation of the rotor shaft 104. However, when air is pumped through the dam inlet 202, a positive pressure differential may be created within the rotor-stator air gap 163 and/or the rotor-dam air gap 165. This pressure differential may create air pockets/air bubbles that inhibit fluids, such as fluid F supplied through the small holes 505a, 505b, 505c, 505d from entering into the rotor-stator air gap 163 and/or the rotor-dam air gap 165. Accordingly the fluid F supplied through the small holes 505a, 505b, 505c, 505d may be directed to the end turns 142a, 142b, 144a, 144b, and may not enter or may only partially enter into the rotor-stator air gap 163 and/or the rotor-dam air gap 165.

Figure 6A:
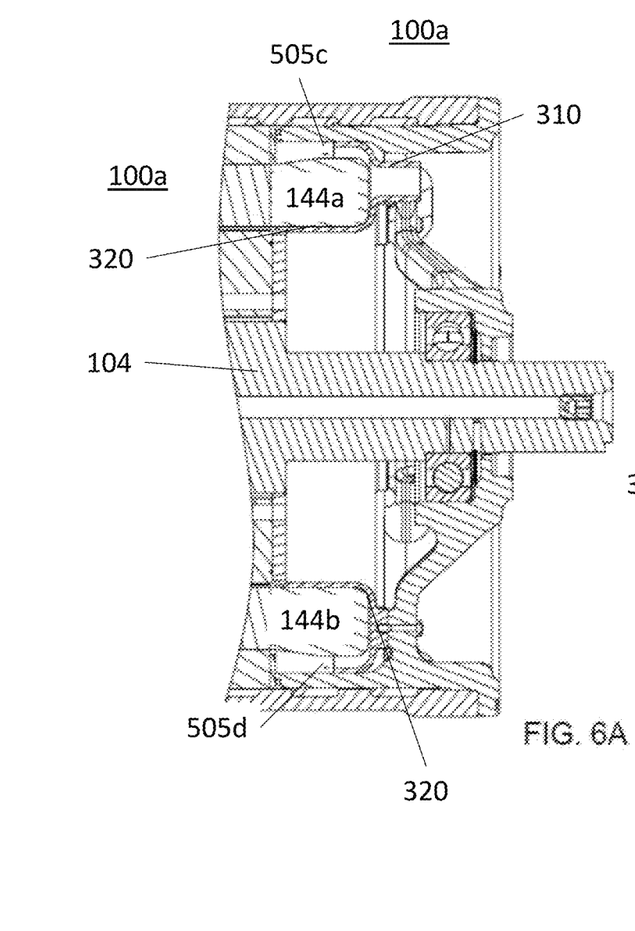
FIG. 6A is a partial cross-sectional view of another end of the electric machine of FIG. 4 according to some example embodiments.
Figure 6B:
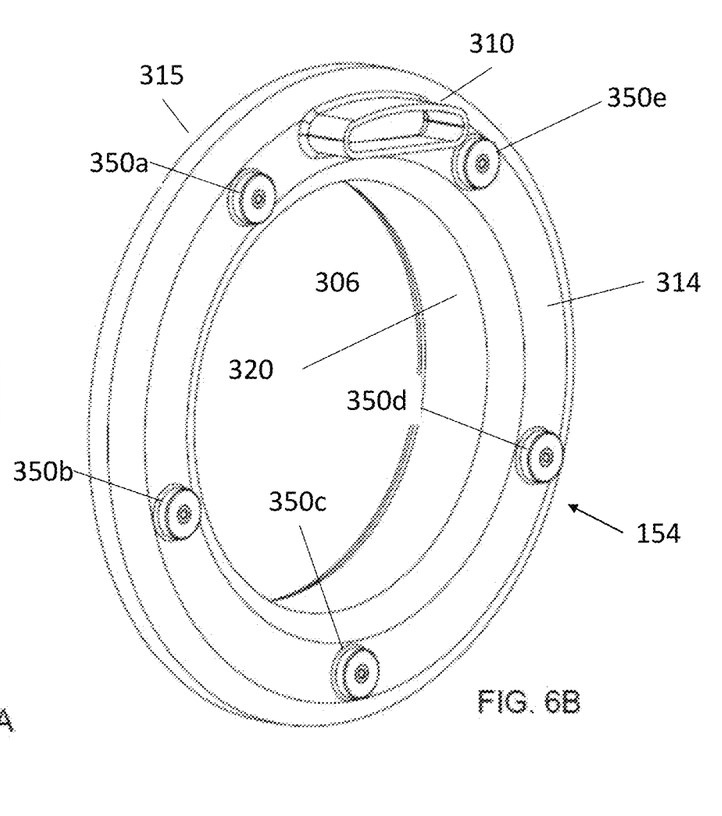
FIG. 6B is a perspective view of a dam element according to some example embodiments.

Referring now to FIGS. 6A and 6B, the second dam element 154 may have an inner surface 315 and an outer surface 314. The inner surface 315 may include recesses 320 sized with respect to end turns 144a, 144b.

The second dam element 154 may have a port 310. The port 310 may be an exit port wherein coolant may exit the electric machine 110a. The coolant, such as fluid F described with reference to FIG. 5C, may exit the electric machine 110a, e.g. may exit and gravitationally fall, e.g. to other components of a work vehicle 50. For example, the fluid F may act as a transmission fluid for the transmission 52 described with reference to FIG. 1. Alternatively or additionally, the fluid F may flow into a drain and/or a sump (not illustrated).

Still further, air, such as air A discussed in FIG. 5C, that is pumped in through the dam inlet 202, may flow out through an opening 306. The air may exit the electric machine 100a.

The second dam element 154 may include a number of connection areas 350a, 350b, 350c, 350d, 350e. The connection areas 350a, 350b, 350c, 350d, 350e may be arranged to secure the second dam element 154 to other components of the electric machine 100a. For example, the second dam element 154 may be secured to the electric machine 100a through a number of screws arranged in the connection areas 350a, 350b, 350c, 350d, 350e. Although five connection areas are illustrated, example embodiments are not limited thereto.

In all electric machines, the shearing of air in the air gap may create windage, which may cause a significant increase in temperature. At higher operating speeds (rotation speeds) of the electric machine 100a, the supply of heat generated is often 0.5 kW to 1 kW in some electric machines 100a. The axial directional component of the air flowing through the air gap reduces, e.g., minimizes the temperature increase of this air, before the air exits the air gap. This air can then be directed out of the electric machine 100a. This same axial flow of air may also reduce heat flow from the rotor assembly 108 to the stator assembly 110 (e.g. if the rotor assembly 108 is the hotter component), and/or may reduce heat flow from the stator assembly 110 to the rotor assembly 108 (e.g. if the stator assembly 110 is the hotter component), as heat flowing from the rotor assembly 108 into the air may be blown out of the air gap.

Figure 7:
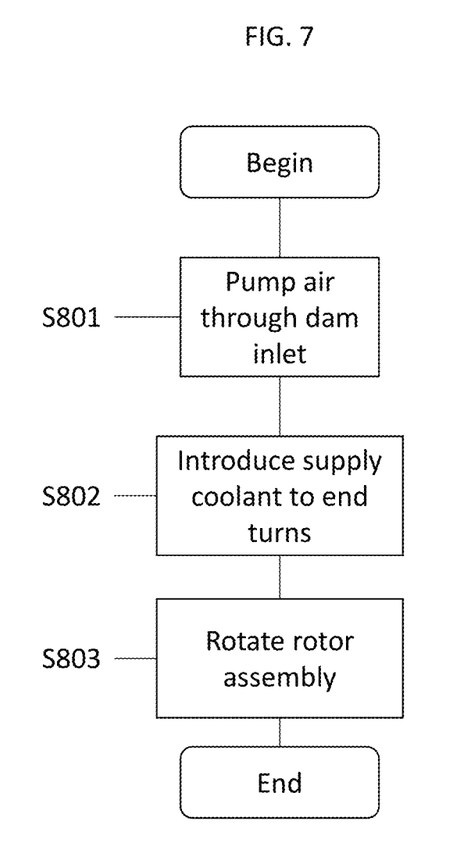
FIG. 7 is a flow diagram of a method for operating the electric machine of FIG. 4 according to some example embodiments.

FIG. 7 illustrates a method of operating an electric machine, according to some example embodiments.

Referring to FIG. 7, at step S801, air may be pumped into a dam inlet located within the electric machine. For example, the air may be supplied by pump 593 described with reference to FIG. 1, and may enter the electric machine 100a through dam inlet 202 described with respect to FIG. 4.

The air that is pumped into the dam inlet may enter a first dam element, such as first dam element 152 described with reference to FIG. 4, and create a positive pressure differential around gaps within components of the electric machine. For example, there may be a positive pressure created in a gap between a rotor core and a stator core. The air that is pumped in through the dam inlet may exit the electric machine, for example from an opening 306 in a second dam element 154 described with reference to FIG. 6B.

At step S802, a coolant, such as a transmission fluid F described with reference to FIG. 5C, may be introduced into the electric machine such as electric machine 100a described above. The coolant may enter through cavities, such as small holes 505a, 505b, 505c, 505d, 505e in the electric machine 100a described above. The coolant may partially or fully surround end turns of stator elements within the electric machine, such as end turns 142a, 142b, 144a, 144b of electric machine 100a.

The coolant may cool the end turns. Additionally, because of positive pressure created by the air pumped in at step S801, the coolant may not enter, or may only partially enter, air gaps between the stator and the rotor and/or between the rotor and the dam, such as air gaps 163, 165 described above. For example, there may be an air bubble/air pockets created by the pressurized air in the rotor-stator air gaps and/or the rotor-dam air gaps. Still further, any coolant that enters the rotor-stator air gap and/or the rotor-dam air gap may be blown away by the pressurized air.

At step S803, a rotor assembly such as rotor assembly 108 may rotate within an electric machine such as electric machine 100 described above. Because end turns such as end turns 142a, 142b, 144a, 144b have been cooled, e.g. cooled in step S802, and/or because there is no, or a small amount of, coolant in air gaps, the rotor assembly 108 may operate at a high speed and/or with an increased efficiency.

According to some example embodiments, each of the steps described above may be optional. For example, air may be pumped into the first dam element in step S801, while no coolant is supplied (e.g. step S802 is not performed). Step S801 may occur before, after, or simultaneously with step S802. For example, supply coolant may be introduced prior to air being pumped. Step S803 may occur before, after, or simultaneously with either or both of steps S801 and S802.

Figure 8:
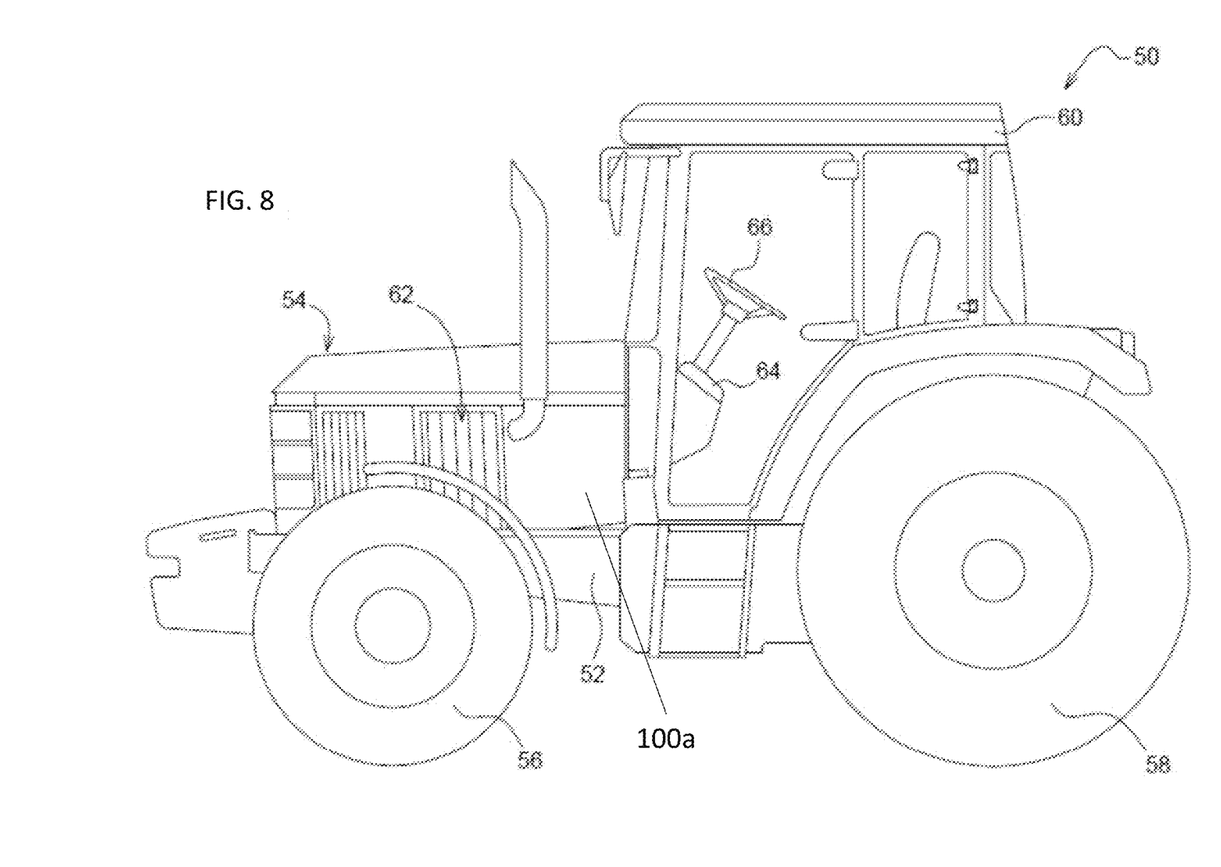
FIG. 8 is a side view of a work vehicle according to some example embodiments.

Referring now to FIG. 8, a vehicle, such as a work vehicle 50, may include a roof 60, a steering wheel 66, a steering column 64, a hood 54, a plurality of front wheels 56, a plurality of back wheels 58, vents 62, and a transmission 52.

The roof 60 may be on top of the work vehicle 50, and may provide shade and/or protection from the elements, such as protection from rain, for a user (e.g. an operator) of the work vehicle 50. The vents 62 may help exhaust air from the work vehicle 50. The steering wheel 66 may enable a user to steer the work vehicle 50, for example by adjusting an orientation of the front wheels 56. The steering wheel 66 may be connected to the steering column 64, which may be connected to the front wheels 56.

There may be an engine (not shown) under the hood 54. The engine may be or include an internal combustion engine that converts a fuel into mechanical energy to drive components of the work vehicle 50, e.g. to drive either or both of the front wheels 56 or the back wheels 58. The fuel may be an organic fuel, e.g. a fossil fuel.

Alternatively or additionally, there may be an electric machine, such as an electric machine 100a described above, that converts electrical energy to mechanical energy. For example, the work vehicle 50 may not convert fuel such as a fossil fuel into mechanical energy. The work vehicle 50 may further correspond to a hybrid electric vehicle, e.g. a vehicle that is driven both by an electric machine and by an internal combustion engine.

The transmission 52 may be operatively coupled to the electric machine 100a. The transmission 52 may adjust power to either or both of the front wheels 56 and the back wheels 58.

Without in any way limiting the scope, interpretation, or application of the claims appearing below, a technical effect of one or more of the example embodiments disclosed herein includes a cooling system and/or a method of operation for an electric machine having a dam assembly to facilitate increased cooling.

While the above describes example embodiments of some example embodiments, these descriptions should not be viewed in a limiting sense. Rather, other variations and modifications may be made without departing from the scope and spirit of some example embodiments as defined in the appended claims.

What is claimed is:

1. An electric machine, comprising:
a housing;
a stator assembly within the housing;

a rotor assembly within the housing; and a dam assembly comprising a first dam element, the first dam element arranged on one end of the electric machine, the first dam element including an air inlet, wherein the air inlet is configured to receive a supply of pressurized air, wherein the first dam element comprises an outer surface comprising a mound, at least one of a height or a width of the mound based on at least one of a size or a length of an end turn of the stator assembly.

2. The electric machine of claim 1, wherein the stator assembly at least partially surrounds the rotor assembly with a rotor-stator air gap between the stator assembly and the rotor assembly, and the pressurized air flows in the rotor-stator air gap.

3. The electric machine of claim 1, wherein the rotor assembly at least partially surrounds the dam assembly with a rotor-dam air gap between the rotor assembly and the dam assembly, and the pressurized air flows in the rotor-dam air gap.

4. The electric machine of claim 1, wherein the first dam element comprises:

an inner portion including a wall, the wall recessed from the outer surface.

5. The electric machine of claim 4, wherein the rotor assembly includes, a rotor shaft configured to rotate around an axis, and at least two plates, the at least two plates arranged on opposing ends of the rotor assembly.

6. The electric machine of claim 5, wherein the rotor assembly further includes, a plurality of cavities having a size to receive a permanent magnet.

7. The electric machine of claim 1, wherein the first dam element is arranged at a non-drive end of the electric machine.

8. The electric machine of claim 1, wherein the first dam element is arranged at a drive end of the electric machine.

9. The electric machine of claim 1, wherein the electric machine further comprises:

at least one end shield having at least one opening to receive a supply coolant, the supply coolant surrounding one or more end turns within the stator assembly.

10. The electric machine of claim 9, wherein the one or more end turns are submerged in the supply coolant.

11. The electric machine of claim 10, wherein a gap between the rotor assembly and the dam assembly includes an air pocket created by the pressurized air.

12. The electric machine of claim 10, wherein a gap between the rotor assembly and the stator assembly includes an air pocket created by the pressurized air.

13. The electric machine of claim 9, wherein the supply coolant is transmission fluid.

14. The electric machine of claim 1, wherein the dam assembly further comprises a second dam element arranged at another end of the electric machine, and the housing includes at least one opening to receive a supply coolant, the supply coolant surrounding one or more end turns within the stator assembly.

15. The electric machine of claim 14, wherein the one or more end turns are submerged in the supply coolant.

16. The electric machine of claim 1, wherein the rotor assembly is configured to rotate in response to a mechanical torque, and the stator assembly is configured to generate an electrical signal in response to the mechanical torque received at the rotor assembly.

17. The electric machine of claim 1, wherein the stator assembly is configured to receive an electrical signal, and the rotor assembly is configured to rotate in response to the electrical signal received at the stator.

18. The electric machine of claim 1, wherein at least one of, the pressurized air affects an amount of supply coolant entering a rotor-stator air gap between the rotor assembly and the stator assembly by creating a first air bubble in the rotor-stator air gap, or the pressurized air affects an amount of supply coolant entering a rotor-dam air gap between the rotor assembly and the dam assembly by creating a second air bubble in the rotor-dam air gap.

19. The electric machine of claim 1, wherein at least one of, the pressurized air blows supply coolant away from a rotor-stator air gap between the rotor assembly and the stator assembly, or the pressurized air blows supply coolant away from a rotor-dam air gap between the rotor assembly and the dam assembly.

20. The electric machine of claim 1, wherein the air inlet is sized to provide approximately 3 liters per minute (lpm) of pressurized air.

21. The electric machine of claim 1, wherein the first dam element comprises:

a cable port proximate to the air inlet, the cable port having a size to receive at least one cable, the at least one cable connected to the electric machine.

22. An electric machine, comprising:

a housing;

a stator assembly within the housing;

a rotor assembly within the housing; and a dam assembly comprising a first dam element, the first dam element arranged on one end of the electric machine, the first dam element including an air inlet, wherein the air inlet is configured to receive a supply of pressurized air, and the first dam element comprises a cable port proximate to the air inlet, the cable port having a size to receive at least one cable, the at least one cable connected to the electric machine.

* * * * *